Patented Dec. 30, 1930

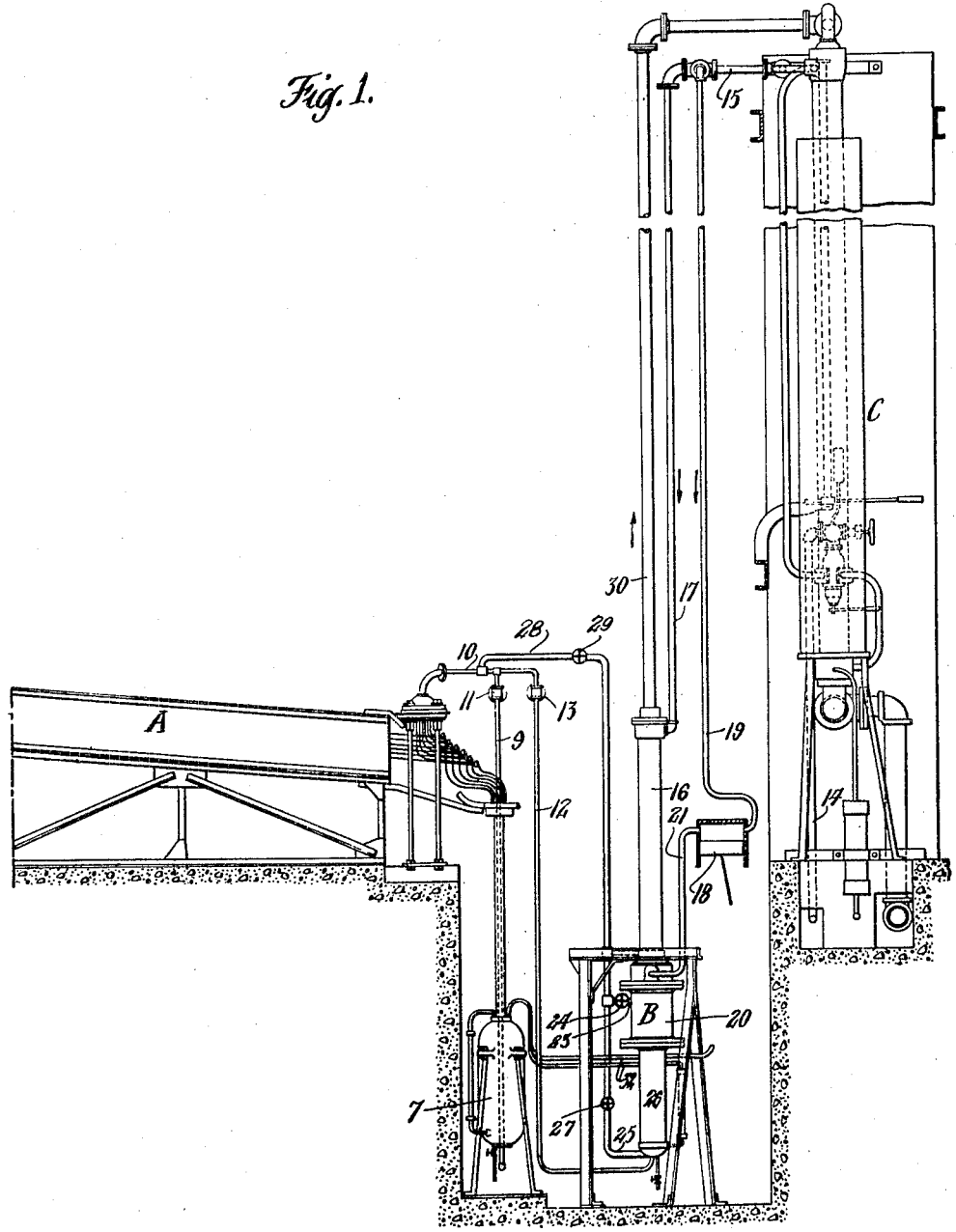

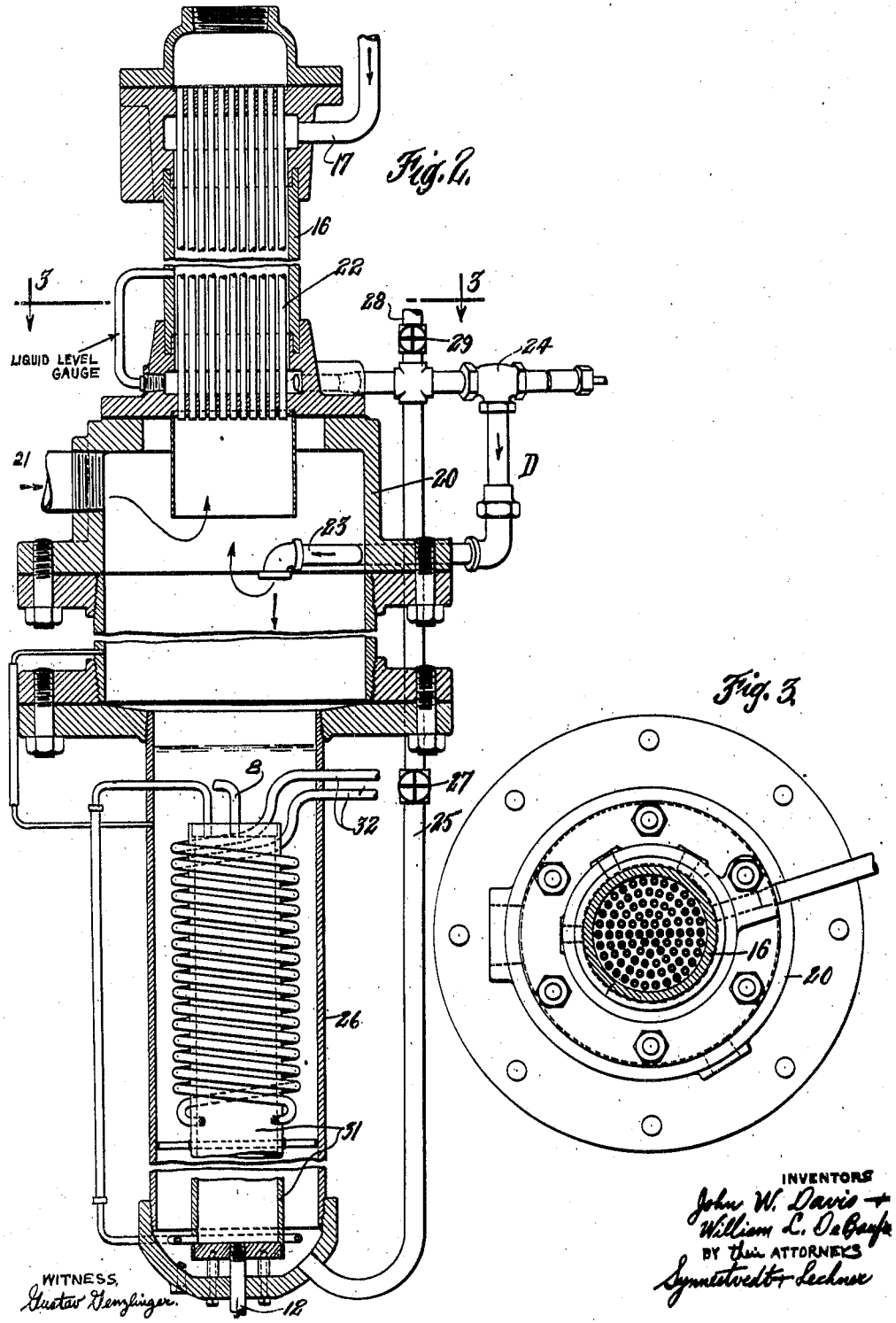

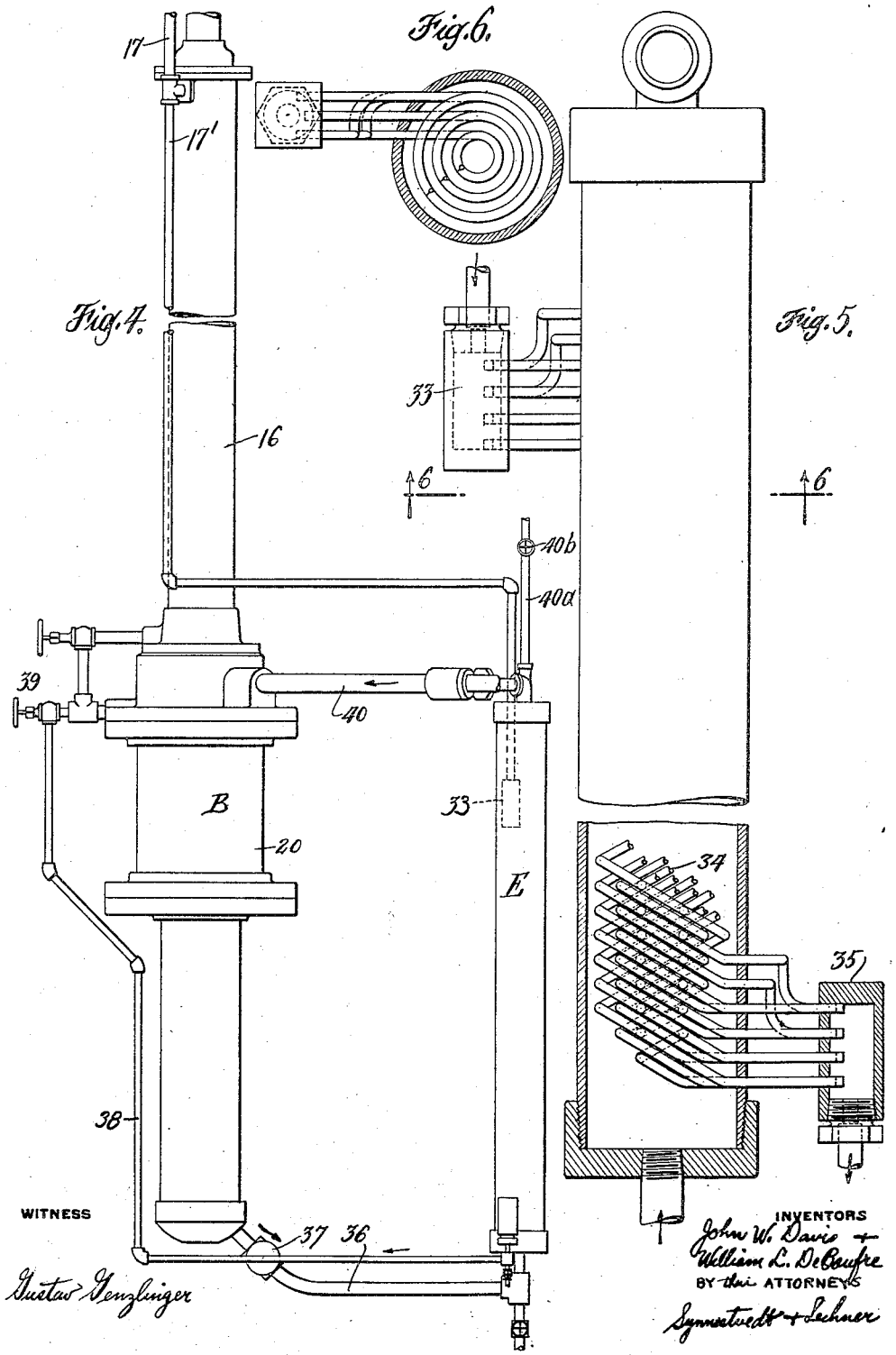

1,786,898

UNITED STATES PATENT OFFICE

WILLIAM L. DE BAUFRE, OF LINCOLN, NEBRASKA, AND JOHN W. DAVIS, OF WASHINGTON, DISTRICT OF COLUMBIA

ART OF LIQUEFACTION

Application filed December 29, 1923. Serial No. 683,274.

This invention relates to the art of liquefaction and has particular reference to the purification of the gaseous product by liquefaction of the undesired constituents remaining after major liquefaction. The present invention may be utilized in connection with the invention shown and described and claimed in co-pending application, Serial No. 588,530, filed September 16, 1922, and it will be described in connection with the purification of helium.

One of the primary objects of our invention is to accomplish purification in a simple, effective and economical manner.

The nature of the invention, its objects and advantages, will be best understood from the following description, taken in connection with the drawings, of which Fig. 1 is a diagrammatic side elevation of our improvement shown in connection with a portion of the apparatus illustrated in the aforesaid co-pending application;

Fig. 2 is a vertical section, drawn on an enlarged scale, of the purifier mechanism proper;

Fig. 3 is a section taken on the line 3—3 of Fig. 2;

Fig. 4 is a side elevation of a modified form of purifier;

Fig. 5 is a side elevation and partial section of the detail of the arrangement of Fig. 4;

Fig. 6 is a section taken on the line 6—6 of Fig. 5.

Referring now to Fig. 1 the reference character A denotes a portion of the liquefier mechanism which is preferably of the character shown in the aforesaid co-pending application and in which the major liquefaction of the undesired constituents is brought about. The liquid condensed in the liquefier together with the remaining vapors are conducted to the liquefier pot 7 and the vapors are then passed through the purifier B where the remaining undesired constituents are liquefied, the product in a comparatively pure state being drawn off by the pipe 8. The liquids collecting in the liquefier pot 7 are returned through the pipe 9 and pipe 10, the pipe 9 being controlled by the throttle 11. The impurities condensed in the purifier are returned through pipe 12 and throttle 13 as will appear more fully hereinafter.

The refrigeration for the purifier is supplied by an external cycle, the refrigerant employed being preferably nitrogen, particularly where helium is the product to be purified. The nitrogen is compressed to a high pressure, say for example in the neighborhood of 500 pounds by suitable compressors and is led to the interchangers C by the pipe 14, the interchangers being of any desired construction and capable of alternate use in case of plugging or freezing. The high pressure nitrogen is cooled in the interchangers by the return stream, and the cooled gases are led from the interchangers by the pipe 15. On leaving the pipe 15 the downcoming stream divides, a portion entering the upper compartment 16 of the purifier by way of the pipe 17, and part being led to an expansion engine 18 by the pipe 19, the expansion engine acting to lower the temperature of the nitrogen by expanding the fluid to about atmospheric pressure. The exhaust from the expansion engine is led into the middle compartment or gas space 20 of the purifier by the pipe 21.

Referring now to Fig. 2 it will be seen that the high pressure nitrogen which enters the upper part of the compartment 16 of the purifier is subjected to the returning fluid passing upwardly from the gas compartment 20 of the purifier through the multiplicity of tubes 22, the downcoming stream being liquefied by yielding up heat to the returning stream. The liquid condensed in the upper compartment collects in the lower part thereof and is drawn off by means of the piping arrangement which, for lack of a better term, we have termed a manifold D. This manifold has a branch 23 controlled by throttle 24, such branch discharging into the gas space 20. It also has a second branch 25 leading into the bottom of the lower or bottom compartment 26 of the purifier, such branch or connection being controlled by the throttle 27. The third branch 28, controlled by throttle 29, leads to the pipe 10. Various advantages result from this arrangement but for the present it will suffice to point out that in normal operation the liquefied nitrogen is conducted to the bottom of the purifier casing, filling the bottom compartment to the level indicated. The return stream consists of the exhaust from the expansion engine 18 before referred to and the vapors boiled off from the liquids collecting in the bottom compartment of the purifier.

The external cycle is a closed one and make-up is added in the usual manner. The gases returning through to the tubes 22 are led to the interchangers through the pipe 30 in counter-flow with the downcoming stream of high pressure nitrogen in the purifier and interchanger, and then passed through the compressors and back to the interchangers, as before.

Mounted in the bottom compartment of the purifier is a purifier pot 31 around which the double pipe 32 which conducts the vapors to be purified from the liquefier pot to the purifier, is wound in a spiral, two branches being employed in order to secure a plurality of coils. The coils discharge into the lower portion of the purifier pot 31. The purifier pot and the coils being immersed in the low pressure nitrogen liquids, the remaining undesired constituents are liquefied and collect in the bottom of the pot 31 and thence are returned back to the liquefier A, under control, by the pipe 12 as before pointed out. The purified helium above the liquid in the pot 31 is withdrawn by the pipe 8. The liquid boiled off in the bottom compartment in liquefying the undesired constituents of course rises through the gas space 20 and mingles with the exhaust of the expansion engine.

The liquefied high pressure nitrogen is throttled to about atmospheric pressure through the throttle 27 so as to lower its temperature and any vapors that may be formed as an incident to such throttling rise through the accumulated liquid in the bottom compartment.

Where the nitrogen is pure or in such cases as where the impurities in the nitrogen boil off at about the same temperature as the nitrogen, we can introduce the liquid from the upper compartment of the purifier into the gas space through the branch 23, after throttling through the throttle 24, because there will be no fractionation and hence the composition of the boiling liquid will be the same as that of the refrigerant supplied to the cycle. If the nitrogen contained high boiling point impurities, the composition of the boiling liquid would not be the same as the refrigerant as originally supplied by reason of fractionation. In such case, when the liquid is throttled, partial vaporization occurs, the vapor formed being in phase equilibrium with the liquid remaining, which consequently contains a larger proportion of the high boiling point impurities than the refrigerant as originally supplied. The liquid remaining after throttling drops to the bottom of compartment 26 where boiling occurs, the vapors arising necessarily having the same composition as that of the liquid after throttling. Consequently the boiling liquid in phase equilibrium with the vapors arising therefrom must contain a still higher proportion of the high boiling impurities. This means that boiling temperature of the very impure liquid will be much higher than that of the original refrigerant under the same pressure. The purity of the product is a function of the temperature and we have found that such double fractionation results in a much less pure product. By introducing the throttled impure liquefied nitrogen into the bottom of compartment 26 we have secured a much more highly purified product because we have secured a lower temperature by obtaining a boiling liquid in phase equilibrium with a vapor having the same composition as the refrigerant originally supplied and consequently boiling at the minimum temperature for the composition and pressure of the refrigerant.

To permit of the possibility of withdrawing high boiling point liquids in the liquefied nitrogen which might accumulate in the bottom of the compartment 16, back through the pipe 28 and throttle 29 to the liquefier, in which or in some other warmer portion of the internal cycle, such high boiling point liquids may be evaporated.

When starting up, the throttles 24 and 27 may be closed and the throttle 29 opened making it possible to use the external cycle refrigerant as a means for cooling down the internal cycle preparatory to introducing the downcoming gas through such cycle.

As a modified arrangement for taking care of high boiling point liquids, we may use the arrangement of Figs. 4, 5 and 6 in which a portion of the high pressure impure nitrogen flowing down through the pipe 17 passes on through the pipe 17′ and is led to liquefier E. The pipe 17′ terminates in a header 33 from which a plurality of pipes in coiled arrangement extend downwardly through the liquefier E and terminate in the header 35. High boiling point liquids are conducted from the bottom of the lower compartment to the bottom of the liquefier E by means of the pipe 36 controlled by the throttle 37. This high boiling point liquid immerses the coils 34 and cools and condenses the high pressure nitrogen gas passing therethrough, the condensate being led by the pipe 38 to the gas space 20, the pipe 38 being controlled by the throttle 39 which acts to remove additional heat. The vapors boiled off from the high boiling point liquids are conducted to the gas space of the purifier by means of the pipe 40 or carried back through the apparatus and discharged to the atmosphere after its refrigerating value has been made use of, as by means of the pipe 40a and valve 40b. In other respects the operation is substantially the same.

In the case of helium, we prefer to introduce the gas to be purified from the liquefier pot at a temperature of about −120° C. to the purifier, the temperature in the pot 31 of which is about −190° C., giving a purity of approximately 95% and a yield of about 82% at a pressure of about 500 pounds of the downcoming gases being processed, which we prefer. The pressure of the return stream in the internal cycle is dropped in the neighborhood of 50 pounds below that of the downcoming stream.

In the purifier there is a large drop in temperature with the abstraction of relatively little heat and the use of nitrogen or similar gas as the refrigerant of the external cycle is very advantageous, in that the refrigerating value of the liquefied nitrogen is very high and the temperature of purification is definitely maintained corresponding to the boiling point of the liquefied nitrogen under the pressure of the return stream. Thus the purity of the product can be maintained substantially constant over long periods of time.

We claim:

1. Apparatus for the purification of the desired vapor constituents derived from previous liquefaction of the undesired constituents of a gas, comprising a casing having an upper and a lower compartment, means for introducing a refrigerating fluid to be liquefied into the upper compartment, a connection between upper and lower compartments for carrying the refrigerant condensed in the upper compartment to the lower compartment, a plurality of tubes extending through the upper compartment and communicating with the lower compartment adapted to pass vapors boiled off in the lower compartment through the upper compartment in heat interchanging relation with the refrigerating fluid introduced into the upper compartment, and means for passing the vapor to be purified in heat interchanging relation with the liquid refrigerant in the lower compartment of the purifier.

2. Apparatus for the purification of the desired vapor constituents derived from previous liquefaction of the undesired constituents of a gas, comprising a casing having an upper and a lower compartment, means for introducing a refrigerating fluid to be liquefied into the upper compartment, a connection between upper and lower compartments for carrying the refrigerant condensed in the upper compartment to the lower compartment, a plurality of tubes extending through the upper compartment and communicating with the lower compartment adapted to pass vapors boiled off in the lower compartment through the upper compartment in heat interchanging relation with the refrigerating fluid introduced into the upper compartment, and means for passing the vapor to be purified in heat interchanging relation with the liquid refrigerant in the lower compartment of the purifier, said connection having a throttle.

3. Apparatus for the purification of the desired vapor constituents derived from previous liquefaction of the undesired constituents of a gas, comprising a casing having an upper and a lower compartment, means for introducing a refrigerating fluid to be liquefied into the upper compartment, a connection between upper and lower compartments for carrying the refrigerant condensed in the upper compartment to the lower compartment, a plurality of tubes extending through the upper compartment and communicating with the lower compartment adapted to pass vapors boiled off in the lower compartment through the upper compartment in heat interchanging relation with the refrigerating fluid introduced into the upper compartment, and means for passing the vapor to be purified in heat interchanging relation with the liquid refrigerant in the lower compartment of the purifier, together with means for introducing a cold refrigerating gas into the lower compartment in the space above the liquid therein.

4. Apparatus for the purification of the desired vapor constituents derived from previous liquefaction of the undesired constituents of a gas, comprising a casing having an upper and a lower compartment, means for introducing a refrigerating fluid to be liquefied into the upper compartment, a connection between upper and lower compartments for carrying the refrigerant condensed in the upper compartment to the lower compartment, a plurality of tubes extending through the upper compartment and communicating with the lower compartment adapted to pass vapors boiled off in the lower compartment through the upper compartment in heat interchanging relation with the refrigerating fluid introduced into the upper compartment, and means for passing the vapor to be purified in heat interchanging relation with the liquid refrigerant in the lower compartment of the purifier, together with an expansion engine connected to receive a portion of the refrigerating fluid and to discharge the same into the lower compartment in the space above the liquid.

5. In the art of liquefaction, the liquefying of the major portion of the undesired constituents by an internal cycle of refrigeration and the liquefying of the remaining undesired constituents by an external cycle employing liquefied nitrogen as the refrigerating medium, without materially reducing the pressure of the gas being processed the liquefied constituents being employed as return fluid in the internal cycle.

In testimony whereof, we have hereunto signed our names.

WILLIAM L. DE BAUFRE.
JOHN W. DAVIS.